US006409857B2

(12) United States Patent
Pallas et al.

(10) Patent No.: US 6,409,857 B2
(45) Date of Patent: Jun. 25, 2002

(54) DEVICE FOR MANUFACTURING A COMPOSITE SHEET

(75) Inventors: Dieter Pallas, Lentforden; Jorg Vonderheiden; Jens Schulz, both of Hamburg, all of (DE)

(73) Assignee: Peters Machinenfabrik GmbH, Hamburg (DE)

(*) Notice: Subject to any disclaimer, the term of this patent is extended or adjusted under 35 U.S.C. 154(b) by 0 days.

(21) Appl. No.: 09/053,814

(22) Filed: Apr. 2, 1998

(30) Foreign Application Priority Data

Apr. 11, 1997 (DE) ........................................ 197 15 174

(51) Int. Cl.[7] ............................ B32B 31/00; B31F 1/00

(52) U.S. Cl. ......................... 156/64; 156/205; 156/210; 156/356; 156/358; 118/258

(58) Field of Search ................................ 156/358, 361, 156/357, 205, 210, 462, 468, 470, 471, 64, 356; 118/258, 248

(56) References Cited

U.S. PATENT DOCUMENTS

| | | | | | |
|---|---|---|---|---|---|
| 2,589,966 | A | * | 3/1952 | Rullo | 118/249 |
| 2,876,734 | A | * | 3/1959 | Nitchie | 118/249 |
| 3,046,935 | A | * | 7/1962 | Wilson | 118/674 |

(List continued on next page.)

FOREIGN PATENT DOCUMENTS

| | | | | |
|---|---|---|---|---|
| DE | 27-17-751 | A1 | | 11/1977 |
| EP | 0-601-528 | A1 | | 6/1994 |
| EP | 0-734-49 | A1 | | 3/1995 |
| EP | 0-574-874 | A1 | | 12/1998 |
| GB | 1138683 | | * | 1/1969 |
| GB | 1145533 | | * | 3/1969 |
| GB | 2 095 430 | | * | 3/1981 |
| GB | 2-164-273 | A | | 3/1986 |
| GB | 2 235 142 | | * | 2/1991 |
| JP | 9-192556 | | * | 7/1997 |

*Primary Examiner*—Curtis Mayes
*Assistant Examiner*—Sue A. Purvis
(74) *Attorney, Agent, or Firm*—Allen N. Friedman; McCarter & English, LLP

(57) ABSTRACT

A device for manufacturing a composite sheet (5) comprising at least one corrugated sheet (1) and at least one flat sheet (3), which is glued to the wave peaks of the corrugated sheet (1), said device comprising at least one fluted roller (13) for shaping and/or maintaining the shape of the corrugated sheet (1), said roller being covered with the corrugated sheet (1) around a portion of its circumference during operation, and a gluing unit (27) for applying a liquid glue used to attach the corrugated sheet (1) to the flat sheet (3), with said gluing unit (27) having a gluing roller (45) whose outer surface (47) is continuously coated with a glue film and whose axis is essentially parallel to that of the fluted roller (13), said gluing roller being driven at approximately the same peripheral speed as that of the fluted roller (13), and with it being possible, using means for moving the rollers closer together (53, 65, 67, 69), to move said gluing roller, with its outer surface (47) against the portion of the circumference of the fluted roller (13) which is covered with the corrugated sheet (1), into a close-up position forming a gluing gap that allows the glue to be transmitted to the wave peaks of the corrugated sheet (1). The means for moving the rollers closer together (53, 65, 67, 69) are designed so as to press the gluing roller (45) against the corrugated sheet (1) and the corrugated sheet (1) against the fluted roller (13). Because the gluing roller (45) is pressed against the corrugated sheet (1), positional measurements of the gluing gap, which are prone to error, are unnecessary. Moreover, a highly uniform gluing pattern of the wave peaks of the corrugated sheet (1) is maintained by providing means for adjusting and controlling the compressive force between the gluing roller (45) and the fluted roller (13).

18 Claims, 3 Drawing Sheets

U.S. PATENT DOCUMENTS 3,972,763 A 8/1976 Wolvin
4,049,485 A * 9/1977 Iverson ....................... 156/351
4,059,474 A 11/1977 Coburn
4,319,947 A * 3/1982 Tokuno ...................... 156/351
4,343,259 A * 8/1982 McConnel .................. 118/44
5,122,220 A * 6/1992 Seki ........................... 156/470
5,348,612 A 9/1994 Buetikofer
5,415,720 A 5/1995 Schonhammer
5,647,947 A * 7/1997 Yasui et al. ................. 156/361
5,876,530 A * 3/1999 Seki et al. .................... 156/64

* cited by examiner

DEVICE FOR MANUFACTURING A COMPOSITE SHEET

RELATED APPLICATIONS

This application depends for priority on German Application No.: 197 15 174.4, filed Apr. 11, 1997

FEDERALLY FUNDED RESEARCH

N/A

BACKGROUND OF THE INVENTION

1. Field of the Invention

The invention is in the field of corrugated composite sheet manufacture.

2. Background Art

The invention concerns a device for manufacturing a composite sheet comprising at least one corrugated sheet and at least one flat sheet that is glued to the wave peaks of the corrugated sheet, said device comprising at least one fluted roller for shaping and/or maintaining the shape of the corrugated sheet, said roller being covered with the corrugated sheet around a portion of its circumference during operation, and a gluing unit for applying a liquid glue used to attach the corrugated sheet to the flat sheet, with said gluing unit having a gluing roller whose outer surface is continuously coated with a glue film and whose axis is essentially parallel to that of the fluted roller, said gluing roller being driven at approximately the same peripheral speed as that of the fluted roller, and with it being possible, using means for moving the rollers closer together, to move said gluing roller, with its outer surface against the portion of the circumference of the fluted roller that is covered with the corrugated sheet, into a close-up position that allows the glue to be transmitted to the wave peaks of the corrugated sheet, thus forming a gluing gap.

For example, this type of device is used for the manufacturing of corrugated cardboard, particularly one-sided corrugated cardboard. In this case, a cardboard or paper sheet is moved between a pair of fluted rollers and stamped into a corrugated sheet. After the corrugated sheet passes through the stamping gap formed between the two fluted rollers, it is pressed against the fluted roller that comes after the stamping gap in the direction of the corrugated sheet using appropriate means, e.g., by creating excess pressure in the space surrounding the fluted rollers and the gluing roller, and moved past the gluing roller, at which point glue is transmitted from the gluing roller to the wave peaks of the corrugated sheet.

In conventional devices, the width of the gluing gap between the gluing roller and the fluted roller opposite it is adjusted so that the wave peaks of the corrugated sheet are immersed in the glue film applied to the gluing roller without coming into contact with or being pressed flat against the surface of the gluing roller. Thus, there is always a gap between the wave peaks of the corrugated sheet and the outer surface of the gluing roller. Ordinarily, the thickness of the glue film is in the range of 0.15–0.40 mm. Accordingly, in the case of conventional devices for the manufacturing of corrugated cardboard, the gluing gap between the gluing roller and the fluted roller must be precisely adjusted. Specifically, on the one hand, the gluing gap must not be too wide in order to ensure that the wave peaks of the corrugated sheet are actually immersed in the glue film. On the other hand, in the case of conventional devices for manufacturing corrugated cardboard, an excessively narrow gluing gap should be avoided in order to prevent the wave peaks of the corrugated sheet from being pressed against the outer surface of the gluing roller.

One possibility for precise adjustment of the width of the gluing gap lies in having an operator hold a test band of a known preset thickness (such as 0.07 mm) between the fluted roller covered with the corrugated sheet and the gluing roller.

The gluing roller is then gradually moved closer to the fluted roller. This operation is carried out with both the fluted roller and the gluing roller rotating. The gluing gap is made smaller and smaller until the operator feels tugging on the test band. In this manner, the actual gap between the gluing roller and the wave peaks of the corrugated sheet lying on the fluted roller is adjusted to the thickness of the test band (for example, 0.07 mm). However, such adjustment of the gluing roller has the disadvantage that it is only possible to adjust the gap width of the gluing gap once before the corrugated cardboard manufacturing device is actually put into operation, and it is not possible to verify or readjust this width during operation. In addition, it is dangerous for the operator to hold the test band between the rotating gluing roller and the running corrugated sheet. As soon as the operator feels tugging on the test band, he/she must immediately let go of the test band to avoid getting his/her fingers caught in the gluing gap. In the case of so-called one-sided machines for the manufacturing of one-sided corrugated cardboard, in which the corrugated sheet is held against the fluted roller by excess pressure, this kind of adjustment of the gluing gap is not possible. As the gluing unit with the gluing roller is located inside a pressure chamber in such one-sided machines, with said chamber necessarily being under excess pressure during operation of the machine so as to hold the corrugated sheet against the fluted roller, the operator can only gain access the gluing gap when the pressure chamber is opened and therefore not under pressure. In this case, however, the corrugated sheet does not remain against the fluted roller, thus making it impossible to adjust the gluing gap using a test band.

In addition, the method is known of adjusting the width of the gluing gap by means of sensory positional measurement. In one method, a non-contact distance sensor is attached to the frame of the gluing unit immediately next to the gluing roller, with said sensor measuring the distance to a target point on a bearing support of the fluted roller. The measurement value given by the distance sensor thus indicates the width of the gap between the frame of the gluing unit and the bearing support of the fluted roller in the area of the distance sensor. Another method consists of attaching a distance sensor to the frame of the gluing unit in the same manner, but with a smooth band attached outside the fluted area of the fluted roller being taken as the target point for distance measurement.

In a third method, the position of an adjustable stop, against which the gluing unit is pressed for specified adjustment of the width of the gluing gap, is determined by means of an appropriate sensor, such as a rotation angle indicator or a position sensor. Any displacement of the stop and thus the width of the gluing gap manifests itself in a corresponding change in the measurement signal emitted by the sensor. Thus the position of the stop is an indicator of the width of the gluing gap.

What the above three measurement methods have in common is that direct measurement of the gluing gap, whose width is the actual parameter of interest, does not take place. Rather, in all cases, distance or positional measurement takes place outside of the gluing gap. It has been found that the distance or positional measurement values obtained by such methods to not provide sufficient data on the actual width of the gluing gap. On the one hand, the measurement conditions at the various measurement sites may differ from conditions in the area of the gluing gap. On the other hand, under the prevailing operating conditions in a corrugated cardboard manufacturing machine, the available distance or position sensors operate relatively inaccurately, with the result that it is necessary to check the measurement device at regular intervals, and in some cases, to recalibrate it.

The above problems in measuring the gluing gap are further aggravated by the temperature conditions prevailing in the environment of this gap. In a corrugated cardboard manufacturing machine, the fluted roller and the press roller, which is used to press the glued corrugated sheet together with a flat sheet, are heated by steam. The heat is absorbed by the paper sheets, i.e., the corrugated sheet and the flat sheet. The flow of heat depends on various parameters, including the thickness of the paper, the amount of glue, the running speed of the sheets, etc. Accordingly, the rollers are subject to temperature influences which cannot be precisely predicted and are difficult or even impossible to keep constant. These temperature influences lead to thermally-induced changes in the size of the roller and thus the width of the gluing gap as well. The machine frame is also subject to temperature variations that may be manifested in the form of changes in the width of the gluing gap.

The measurement system must also be capable of detecting these temperature-induced fluctuations in the width of the gluing gap in order to readjust this gap correspondingly. In view of the fact that even measurement of the basic position of the gluing gap is difficult in conventional distance or positional measurement methods, it is very difficult to precisely determine thermally-induced variations in the width of the gluing gap. This applies in particular in view of the fact that the temperature conditions at the sites at which the sensors are attached may differ considerably from the actual temperature conditions prevailing in the environment of the gluing gap. All of this leads to inaccuracies in adjusting the gluing gap which may result in fluctuations in the amount of glue applied to the wave peaks of the corrugated sheet, corresponding fluctuations in the quality of gluing of the corrugated sheet to the flat sheet, and corresponding fluctuations in and impaired quality of the end product.

Accordingly, the purpose of the invention is to make adjustment of the gluing gap easier in a device of the type mentioned at the outset.

SUMMARY OF THE INVENTION

The invention achieves this purpose by providing that the means for moving the rollers closer together are designed so as to press the gluing roller against the corrugated sheet and the corrugated sheet against the fluted roller.

In the solution according to the invention, the gluing roller is pressed with its outer surface against the corrugated sheet lying on the fluted roller, i.e., against the wave peaks of the corrugated sheet. At first glance, one might think that this would impair glue transfer from the gluing roller to the corrugated sheet, as the gluing roller presses against the corrugated sheet exactly at the position where the transfer of glue is desired (i.e., at the tips of the wave peaks of the corrugated sheet), thus causing a certain degree of displacement of the glue toward the lateral flanks of the wave peaks. Surprisingly, it has been found that this kind of effect does not occur. On the contrary, there is even an improved transfer of glue and thus and improvement in gluing together of the corrugated sheet and the flat sheet compared to the conventional method. It is thought that this has to do with the moistening conditions prevailing between the surface of the corrugated sheet and the glue. Specifically, it is thought that the adhesion forces acting between the surface of the corrugated sheet and the glue cause the glue that has been displaced to the flanks of the wave peaks to spread to the tip of the wave peaks, thus resulting in uniform and complete moistening of the wave peaks over their tips. For this reason, in selecting and setting the parameters affecting the transfer of glue, such as the type of glue, the paper quality, the peripheral speed of the gluing roller and fluted roller, the thickness of the glue film, etc, one should also take into consideration the moistening conditions between the surface of the corrugated sheet and the glue, and if applicable, carry out tests to determine the values of the parameters affecting the transfer of glue which allow optimal moistening of the wave peaks to be achieved. In any event, unexpectedly uniform gluing patterns of the corrugated sheet can be achieved, i.e., extremely uniform quality of glue application to the wave peaks of the corrugated sheet both over the length of an individual wave and over several successive waves in the direction of movement of the corrugated sheet.

The problems with respect to measuring and adjustment of the gluing gap existing with conventional corrugated cardboard manufacturing machines are avoided in the case of the present invention. The invention moves away from the conventional view that a preset space must be left between the wave peaks of the corrugated sheet and the outer surface of the gluing roller. Accordingly, although this type of space was conventionally considered to be the decisive parameter determining the quality of glue application, this is not the case in the present invention. Positional measurement of the width of the gluing gap in order to determine the available space between the wave peaks of the corrugated sheet and the outer surface of the gluing roller, with the accompanying problems described above, is no longer necessary. Because the gluing roller is pressed against the corrugated sheet, the compressive force with which said roller is pressed against said sheet constitutes an additional parameter which can be easily measured and adjusted. On the one hand, it is not necessary to measure this compressive force in the immediate area of the gluing gap, as said force can also be reliably determined at other sites located in the transmission path by measuring a force which is available at the other site and that generates the compressive force. On the other hand, thermally-induced dimensional changes in the area of the gluing gap can immediately be sensorially determined by means of measuring the compressive force, thus making it possible to easily correct such thermal influences by manually or automatically readjusting the compressive force.

The means for moving the rollers closer together should include setting means for setting a predetermined compressive force between the gluing roller and the fluted roller, so that, for example, in the case of different types of glue or differing paper quality, individually defined force conditions can be set in the gluing gap. Preferably, the means for moving the rollers closer together are control means for regulated maintenance of a preset compressive force between the gluing roller and the fluted roller. In this case, a target compressive force that can be externally preset or stored in a control unit is compared with an actual measured compressive force, and in the event of discrepancy, corresponding readjustment of the compressive force may be carried out until these discrepancies are eliminated. It is possible to store numerous values for the target compressive force in advance in the control unit in table form, said values being selected as appropriate depending on parameters such as the paper quality, type of glue, or viscosity of the glue.

BRIEF DESCRIPTION OF THE DRAWINGS

In the following, the invention is explained with reference to the attached drawings. The figures show the following.

DETAILED DESCRIPTION OF THE INVENTION

Figure 1:
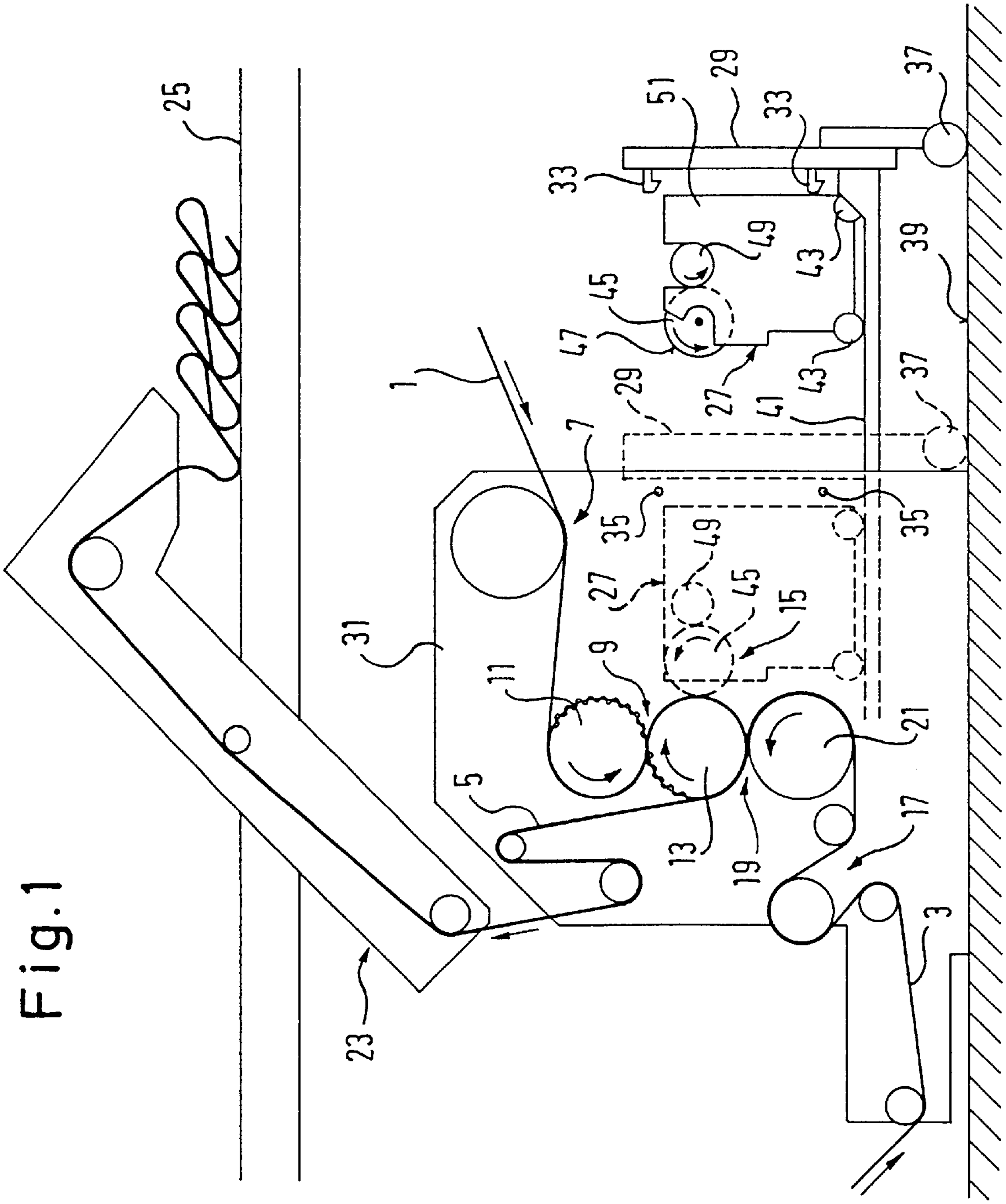
FIG. 1: An elevational view of a device for the manufacturing of a composite sheet according to the invention.

The compressive force acting on the corrugated sheet is selected such that weakening of the material of the corrugated sheet does not take place. Particularly favorable gluing results can be achieved if there is a maximum line pressure (i.e. the force in newtons per millimeter of contacting roller length) between the gluing roller and the wave peaks of the corrugated sheet of between 0.1 N/mm and 10.0 N/mm, and preferably between 0.3 N/mm and 5.0 N/mm, with a value of between 0.5 N/mm and 3.0 N/mm being particularly preferred. Empirical values show that the material properties of paper are not adversely affected even with a line pressure of up to 15.0 N/mm, so that with the preferred values for the line pressure acting on the corrugated sheet, there is little risk of impairment of the quality of the corrugated sheet material.

The effective compressive force in the gluing gap between the gluing roller and the fluted roller is a parameter that affects the production properties of the finished glued product. An additional parameter affecting the properties of the product is the fluctuation behavior of the width of the gluing gap. The reason for this is as follows: the pressing of the gluing roller against the corrugated sheet and that of the corrugated sheet against the fluted roller result in mechanical coupling of the gluing roller to the fluted roller. As the corrugated sheet runs along the outer surface of the gluing roller with its wave peaks, the distance between the outer surface of the gluing roller and the surface of the corrugated sheet changes periodically due to the successive wave peaks and wave valleys of the corrugated sheet. This may give rise to oscillations whose frequency or frequencies may depend, among other factors, on the distance between the successive wave peaks of the corrugated sheet, i.e., on the pitch of the fluting of the fluted roller, and on the peripheral speeds of the gluing roller and the fluted roller. The oscillations may lead to changes in the width of the gluing gap and the pressure conditions between the gluing roller and the corrugated sheet. Accordingly, the quality of glue transfer to the wave peaks of the corrugated sheet, and finally the properties of the glued final product, may be subject to fluctuations. Thus, the fluctuation behavior of the width of the gluing gap also constitutes a parameter which may affect product quality.

In a preferred refinement of the invention, the compressive force acting in the gluing gap between the fluted roller and the gluing roller and/or the fluctuation behavior of the width of the gluing gap between the fluted roller and the gluing roller are or can be adjusted according to the characteristics of a previously-glued exemplary intermediate or end product. If desired the compressive force can be adjusted in coordination with other parameters affecting the characteristics of the product, such as the thickness of the glue film, the viscosity of the glue, the gluing properties of the glue, the material properties of the corrugated sheet and, in particular, the absorption of the corrugated sheet, the moistening conditions between the corrugated sheet and the glue, and the peripheral speeds of the fluted roller and gluing roller. In this connection, previously-glued intermediate or end products are examined for selected product characteristics, and one can then determine whether these product characteristics meet a desired or required quality standard. In this case, if there are deviations, the compressive force and/or fluctuation behavior of the gluing gap are adjusted in order to improve product quality. This is carried out by means of tests prior to the actual beginning of operation of the manufacturing device, but it can also take place during operation, e.g., while subjecting exemplary intermediate or final products to a test, and if applicable, correspondingly setting the effective compressive force and/or fluctuation behavior of the gluing gap with the machine running. In such cases, if appropriate, other parameters may also be taken into consideration, specifically those mentioned above, such as the thickness of the glue film and viscosity of the glue, as these parameters are of decisive importance for the quality of the final product. These parameters are mutually dependent on the effective compressive force and fluctuation behavior of the gluing gap.

A gluing pattern in the area of the wave peaks of the corrugated sheet can be used as a criterion for evaluating product characteristics. This should preferably be observed as a series of gluing patterns in successive wave peak areas. For example, such a gluing pattern may be determinable by optical observation, particularly after a dyeing operation. In order to manufacture corrugated cardboard, a frequently used glue is composed of starch dispersed and/or dissolved in water. The starch in the glue applied to the wave peaks of the corrugated sheet may be dyed by chemical treatment, for example with iodine, thus making it possible to observe the sites at which too much or too little glue was applied to the wave peaks of the corrugated sheet. The dyed starch makes it possible to obtain a gluing pattern can be used to determine the quality, and particularly the uniformity, of glue application to the wave peaks of the corrugated sheet.

Fluctuations in the width of the gluing gap, for example, make it particularly noticeable on the gluing pattern that individual wave peaks show relatively light glue application (corresponding to maximum width of the gluing gap) and other wave peaks show relatively heavy glue application (corresponding to minimum width of the gluing gap). The regularity with which the wave peaks with relatively heavy application of glue or wave peaks with relatively light application of glue recur is an indicator of the period of the fluctuations in the width of the gluing gap. If the fluctuations are completely or largely eliminated by appropriately adjusting the fluctuation behavior of the gap, such periodically recurring in the gluing patterns of the wave peaks disappear, so observation of the gluing patterns provides reliable information on the quality of glue application to the corrugated sheet.

The fluctuation behavior of the width of the gluing gap is or can be adjusted by influencing the components are directly or indirectly involved in the formation of the gluing gap with respect to their mass and/or bearing damping and/or inner damping and/or their elasticity and/or the rigidity of their mutual mechanical coupling. The friction conditions at the bearing sites of the components involved in the formation of the gluing gap are of decisive importance for the damping of any fluctuations in the width of the gluing gap. For example, by appropriate adjustment of the friction between the gluing unit and guiding means for this gluing unit, one can achieve significant damping of such fluctuations in the width of the gap. In addition, one must take into consideration the fact that the effective compressive force in the gluing gap can also be a parameter affecting the fluctuation behavior of the width of the gluing gap. It is therefore possible, in cases where fluctuations in the width of the gluing gap are detected, to attempt to suppress these fluctuations first by changing the effective compressive force before adjusting the components involved in forming the gluing gap are with respect to their previously-mentioned parameters. It has been found that in the case of the solution according to the invention, by appropriate mutual coordination of the parameters available for influencing the fluctuation behavior of the width of the gluing gap, the tendency toward fluctuations in the width of the gluing gap is suppressed to such an extent that a virtually uniform gluing gap is achieved in successive wave peaks of the corrugated sheet, resulting in uniform application of glue to the wave peaks, thus a uniform gluing pattern.

A further measure for largely or completely suppressing fluctuations in the width of the gluing gap may lie in the fact that a resonance frequency or resonance frequencies in the vibration behavior of the width of the gluing gap are outside of frequencies determined by the rotational speed of the rollers and/or the pitch of the roller fluting. The resonance behavior of the width of the gluing gap is considerably influenced by the mass of the components involved in forming the gluing gap, their inner elasticity, and their mutual elasticity. Therefore by appropriate selection and mutual coordination of these parameters, it is possible to avoid resonant affections on of the width of the gluing gap.

As explained above, the fluctuation behavior of the width of the gluing gap should preferably be adjusted in such a way that virtually identical gluing patterns are achieved in successive wave peak areas. Since it is practically impossible to affect the quality and properties of the corrugated sheet material by making adjustments directly in the area of the gluing station of a corrugated cardboard manufacturing unit, the device should be designed so that adjustment of the fluctuation behavior of the width of the gluing gap takes place in the area of (a) the gluing unit, (b) the means for moving the rollers closer together, and/or (c) the guiding means for the gluing unit.

The gluing roller may be positioned on a gluing roller support opposite the fluted roller. The gluing roller support is displaceably guided by guiding means. In this case, the means for moving the rollers closer together may be at least one force-generating means which engages the gluing roller support in order to transmit a force to the gluing roller support. The guiding means should preferably form a straight guide for the gluing roller support such that the gluing roller support can be moved away from the fluted roller in order to permit access to the fluted roller for possible cleaning or maintenance work. For example, the gluing roller support may be a wagon guided on wheels that can be partially or completely rolled out of the machine frame and then rolled back in.

The force produced by at least one force-generating means, such as a hydraulically actuated piston-cylinder unit can essentially completely be used to produce a compressive force between the gluing roller and the fluted roller. The force made available is essentially transmitted on a single force transmission path that runs via the gluing roller and the fluted roller. Alternatively, the force produced by the at least one force-generating means may also be branched, specifically into a first force transmission path that transmits a compressive force between the gluing roller and the fluted roller, and at least one additional force transmission path. In this latter case, said additional force transmission path may contain a stop means, which preferably comprise at least one stop arranged on the gluing roller support for movement together with the gluing roller along its approaching path. The additional force transmission path also comprise at least one counterstop, that is fixed with respect to the rotational axis of the fluted roller. In this embodiment, a portion of the force made available by the at least one force-generation means is transmitted on the first force transmission path and another portion of this force is transmitted on at least one additional force transmission path, if applicable via the stop means contained therein.

If the force produced by at least one force-generating means is essentially completely transmitted on a single force transmission path that runs via the gluing roller and the fluted roller, a change in the effective compressive force between the gluing roller and the fluted roller can be caused by a corresponding change in the force produced by the at least one force-generating means. In cases where several force transmission paths are provided, on which the force made available by at least one force-generating means is transmitted, in addition to the above possibility, a change in the effective compressive force between the gluing roller and the fluted roller can be affected by modifying the relationship between the forces that are transmitted on the various force transmission paths. In cases where stop means are present, the relationship of the forces in the various force transmission paths can be modifiable simply by displacement of at least one of the components of the stop and counterstop. Preferably, the force transmitted in the first force transmission path is small compared to the force made available by at least one force-generating means. In this case, via at least one additional force transmission path, a relatively large force can be transmitted, by means of which the gluing roller support can be pressed so firmly against a counterstop positioned in a fixed position with respect to the rotational axis of the fluted roller, that the tendency toward the occurrence of fluctuations in the width of the gluing gap is almost completely suppressed. In contrast, in the event of only one force transmission path, the force applied to the gluing roller support by the at least one force-generating means is relatively small corresponding to the effective compressive force between the gluing roller and the fluted roller, with the result that the fluctuating linkage between the gluing roller and the fluted roller is extremely weak and the tendency toward occurrence of fluctuations in the width of the gluing gap is largely eliminated. The latter applies particularly in cases where the gluing unit has a large mass (for example, a few hundred kilograms or even a ton or more) and a certain degree of frictional damping occurs between the gluing unit and guiding means for the gluing unit.

In order to determine the effective compressive force between the gluing roller and the fluted roller, appropriate measuring means should be provided. The measuring means may, with the adjustment means and/or the control means, form a regulation loop for regulated maintenance of a predetermined value of the compressive force or a predetermined variation of the compressive force depending on the time or approach distance. In order to measure force, force gauges with wire strain gauges may be used. These gauges are sturdy and allow extremely precise measurements. Any changes in the force conditions in the area of the gluing gap (for example, due to thermal effects or a change in the corrugated sheet material) are immediately detected by the force measurement means and can be stabilized via the regulation loop. The measurement means may be designed so as to measure the force produced by at least one force-generating means. They may also be designed to measure the force transmitted on at least one additional force transmission path, and in the latter case, the effective compressive force may be determined by the formation of a difference between the force produced by at least one force-generating means and the force transmitted on the at least one additional force transmission path.

The peripheral speed of the gluing roller should preferably be adjusted such that it is as much as 5% less than the peripheral speed of the fluted roller. Preferably, the lag of the gluing roller with respect to the corrugated sheet lying on the fluted roller should be in the range of approximately 2%.

FIG. 1 shows a machine for the manufacturing of one-sided corrugated cardboard. In this machine, a first paper or card-board sheet 1 forming a corrugated sheet is glued together with a second flat paper or cardboard sheet 3 serving as a covering sheet in order to form a composite sheet 5. The paper sheet 1 first runs through a preparation area 7 in which it is prepared for subsequent shaping and gluing. After this, the paper sheet 1 arrives in a shaping area 9 with a pair of fluted rollers 11 and 13 which rotate in the same direction. The two fluted rollers 11, 13 delimit a fluted gap in which the paper sheet 1 is stamped and given its corrugated shape. In a gluing station 15 which follows in the shaping area 9 in the direction of movement of the corrugated sheet 1, the corrugated sheet 1 is coated with glue on one side by applying glue to the wave peaks of the corrugated sheet 1.

At the same time, the flat sheet 3 passes through a preheating area 17 and reaches a pressing area 19, where it is pressed together with the corrugated sheet 1 on its glued side to form the composite sheet 5. In the pressing area 19, there is a guide roller or press roller 21 which, together with the fluted roller 13 delimits a pressing gap in which the flat sheet 3 and the corrugated sheet 1 are guided together and pressed into a single sheet. The composite sheet 5 manufactured in this manner is discharged via a discharge device 23 and then dried on a drying section 25.

The gluing station 15 is included in a gluing unit 27, which, by means of a slide 29, can be slid into the frame 31 of the manufacturing machine and can also be slid out of said frame. FIG. 1 shows the slide 29 with the gluing unit 27 in its slid-out position, and, in its slid-in position indicated by a dotted line. On the slide 29 are mounted interlocking means 33 which are solidly locked into counter-interlocking means 35 which are solidly mounted on the machine frame with the slide 29 in a slid-in position. In the slid in position the slide 29 is solidly anchored on the machine frame 31. It can be rolled on wheels 37 along a roller surface 39 which is stationary with respect to the machine frame 31 and has a roller guide 41 on which the gluing unit 27 can be rolled on wheels 43. The gluing unit 27 can be moved along the roller surface 41 by means of means for moving it closer not shown in FIG. 1 which act between the slide 29 and the gluing unit 27, and it can be brought closer to the fluted roller 13 with the slide 29 in a slid in position.

The gluing unit 27 comprises a gluing roller 45, which is driven in the same direction as the fluted roller 13 with approximately the same peripheral speed at their point of contact. The gluing roller 45 is immersed with its outer surface 47 in a glue bath which is not shown. As a result of its rotation, a glue film is continually applied from the glue bath to the outer surface 47 of the gluing roller 45. In order to adjust the thickness of the glue film applied to the gluing roller 45, the gluing unit 27 comprises a glue metering roller 49 which can be adjusted with respect to the gluing roller 45. The gluing roller and the glue metering roller delimit an adjustable metering gap. The glue film applied to the gluing roller is precisely metered in this metering gap between the gluing roller 45 and the glue metering roller 49. The glue metering roller 49 is driven in the opposite direction to the gluing roller 45, and with a peripheral speed that is approximately 40–60% of the peripheral speed of the gluing roller 45. In addition, the gluing unit 27 comprises a wagon 51, to which wheels 43 are attached that serves as a support of the gluing roller 45 and the glue metering roller 49. In the wagon 51, among other components, there are the rotational gears of the gluing roller 45 and the glue metering roller 49 and the glue bath, in which the outer surface 47 of the gluing roller 45 is immersed.

In order to put the machine into operation, the slide 29 and the gluing unit 27 are rolled into the machine unit and bolted onto the machine frame 31 by means of the interlocking means 33. Next, excess pressure is produced in the area surrounding the gluing unit 27 and at least the fluted roller 13 in order to press the corrugated sheet 1 coming from the fluted roller 11 against the portion of the circumference of the fluted roller 13 which is turned toward the gluing roller 45. It is also possible to hold the corrugated sheet 1 against the fluted roller 13 by means of suction. The gluing unit 27 is then moved closer to the fluted roller 13 by means for such movement which are not shown in FIG. 1 but are explained in greater detail in connection with FIGS. 2 and 3, until the outer surface 47 of the gluing roller 45 comes into pressure contact with the corrugated sheet 1, or more precisely, into pressure contact with the wave peaks of the corrugated sheet 1. The peaks of the corrugated sheet 1 are therefore not only immersed in the glue film applied to the gluing roller 45, but are also subjected to a compressive load. The line pressure exerted on the wave peaks of the corrugated sheet should preferably be in the range of 0.5 to 3.0 N/mm. The thickness of the glue film on the gluing roller 45 is selected depending on various parameters, such as the paper quality, the type of glue used, and the glue viscosity. An additional parameter is machine speed, i.e., the running speed of the corrugated sheet 1 and the flat sheet 3. The thickness of the glue film should preferably be in the range of 0.1 mm–0.6 mm, with the machine speed having an effect on selection of the thickness of the glue film such that at higher machine speeds, a lower film thickness is ordinarily selected. Figures showing the dependency of the glue film thickness on machine speed may be prepared in table form in advance and stored in the control unit. Corresponding to these tables, the metering gap between the gluing roller 45 and the glue metering roller 49 is adjusted in order to achieve the appropriate thickness of the glue film for the machine speed. The construction of such tables relating machine settings to product characteristics is common in this industry in the set-up of machines with many variables.

Figure 2:
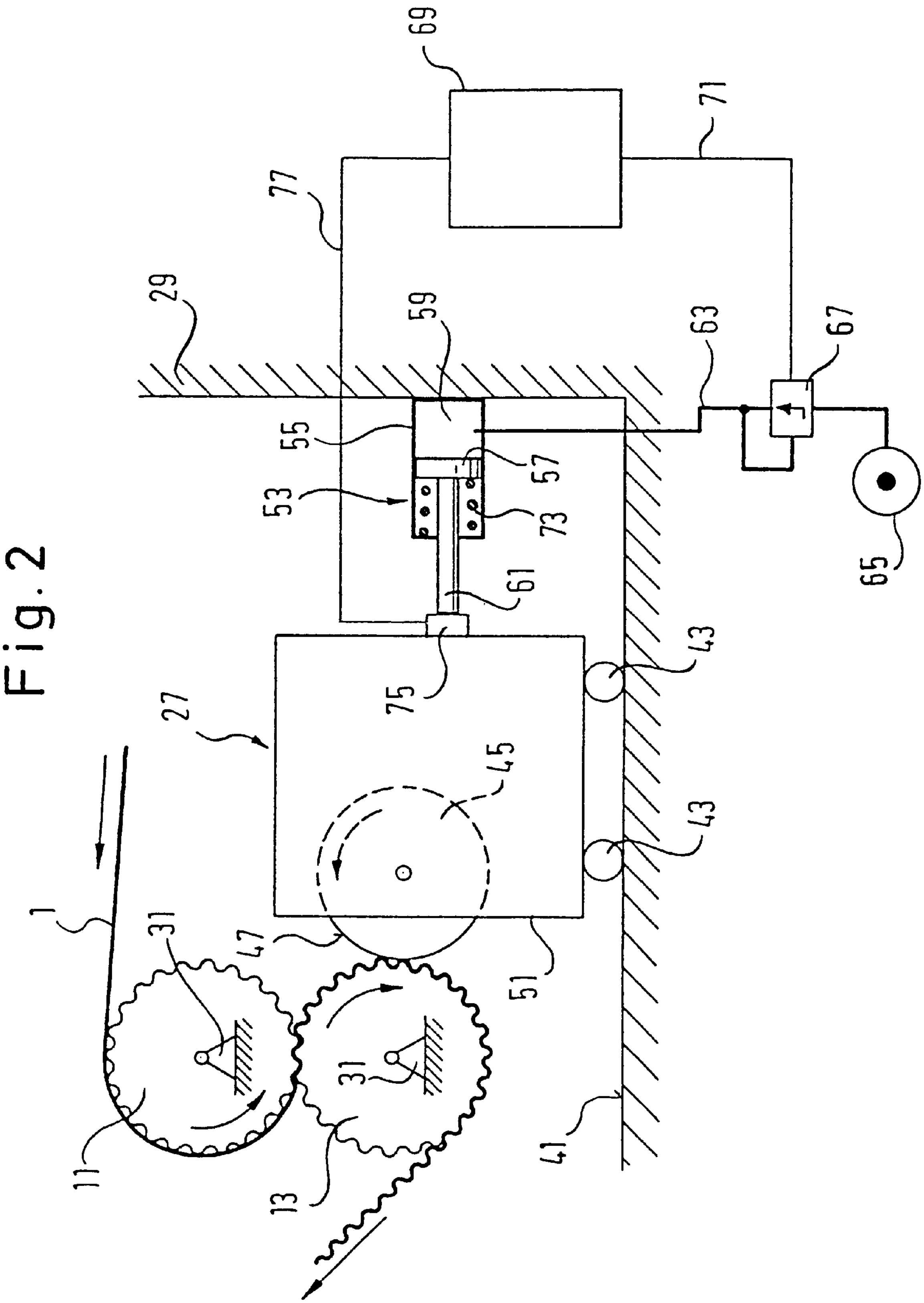
FIG. 2: A schematic diagram of a first embodiment of the device of FIG. 1.

FIG. 2 shows a schematic view of a first embodiment of the machine in FIG. 1. In this embodiment, a hydraulically actuated piston-cylinder unit 53 is provided in order to move the gluing unit 27 closer to the fluted roller 13, said unit 53 engaging with the slide 29 which is solidly bolted to the machine frame 31 of the machine to which the fluted rollers 11, 13 are also bolted. The other side of the piston-cylinder unit 53, engages with the wagon 51 of the gluing unit 27. The piston-cylinder unit 53 comprises a cylinder 55 in which a piston 57 is displaceably arranged, mounted on the slide 29. The piston 57 in the cylinder 55 forms on end of a working chamber 59 and is connected on the side away from the working chamber 59 to a piston rod 61 which extends outward from the cylinder 55 and engages with the wagon 51 of the gluing unit 27 in such a way as to transmit force to it. A hydraulic line 63 is attached to the working chamber 59. From a hydraulic pressure source 65, hydraulic pressure is applied to the working chamber 59 of the piston-cylinder unit 53 via the hydraulic line 63. The hydraulic line 63 contains a pressure adjustment valve 67. This pressure adjustment valve 67 is controlled to produce a constant pressure so that any fluctuations in pressure on the part of the hydraulic pressure source 65 are not transferred to the working chamber 59 of the piston-cylinder unit 53. For example, the hydraulic pressure source 65 may consist of a hydraulic pump. The pressure produced by the pressure regulation valve 67 can be adjusted. For this purpose, a control line 71 attached to a control unit 69 is connected to the pressure regulation valve 67. A pressure may be selected as needed via this control line 71 from the control unit 69, said pressure in the working chamber 59 being adjusted by means of the pressure regulation valve 67. A spring 73 located in the cylinder 55 on the side of the piston away from the working chamber 59 biases the piston 57 in the direction of reducing the volume of the working chamber 59.

In order to adjust the machine, after the slide 29 is bolted to the machine frame 31, pressure is applied to the working chamber 59 of the piston-cylinder unit 53 so that the piston 57 is pushed out together with the piston rod 67, and the wagon 51 of the gluing unit 27 is moved toward the fluted roller 13. In this process, the gluing roller 45 comes into pressure contact with the corrugated sheet 1 lying on the surface of the fluted roller 13. The working chamber 59 is pressurized strongly enough to achieve the desired effective compressive force between the gluing roller 45 and the fluted roller 13.

In order to measure the compressive force between the fluing roller 45 and the fluted roller 13 a force gauge 75 is provided, that is positioned in the force transmission path of the force produced by the piston-cylinder unit 53. This force transmission path runs from the piston-cylinder unit 53 via the wagon 51, the gluing roller 45, and the corrugated sheet 1 to the fluted roller 13, from which the force transmitted is to the machine frame 31. This is essentially the only force transmission path along which the force produced by the piston-cylinder unit 53 is transmitted. The compressive force which acts between the gluing roller 45 and the fluted roller 13 is therefore immediately detected at the force gauge 75 positioned in this force transmission path between the piston rod 61 and the wagon 51. The measurement signal produced by the force gauge 75 is transmitted via a measurement signal line 77 to the control unit 69, where it is evaluated. If necessary, an adjustment signal is produced and sent via the control line 71 to the pressure regulation valve 67 in order to modify the pressure in the working chamber 59, thus adjusting the compressive force between the gluing roller 45 and the fluted roller 13. The control unit 69 may contain a micro-processor which, depending on the actual force detected by the force gauge 75, activates a control program in order to adjust the measured compressive force to a desired target compressive force.

The force produced by the piston-cylinder unit 53 is adjusted within a specified range. On the one hand, it must be large enough to overcome the rolling friction of the wheels 43 when the gluing unit 27 is moved closer. On the other hand, it should not be too large, in order to prevent linked fluctuation of the gluing unit 27 and the fluted roller 13. It has been found that when these conditions are met, fluctuations in the width of the gluing gap formed between the gluing roller 45 and the fluted roller 13 are essentially absent. In particular, when the mass of the wagon 51 is extremely large (for example, on the order of a ton) and the force produced by the piston-cylinder unit 53 is relatively small, one finds that there is virtually no coupled ascillation between the gluing unit 27 and the fluted roller 13.

Figure 3:
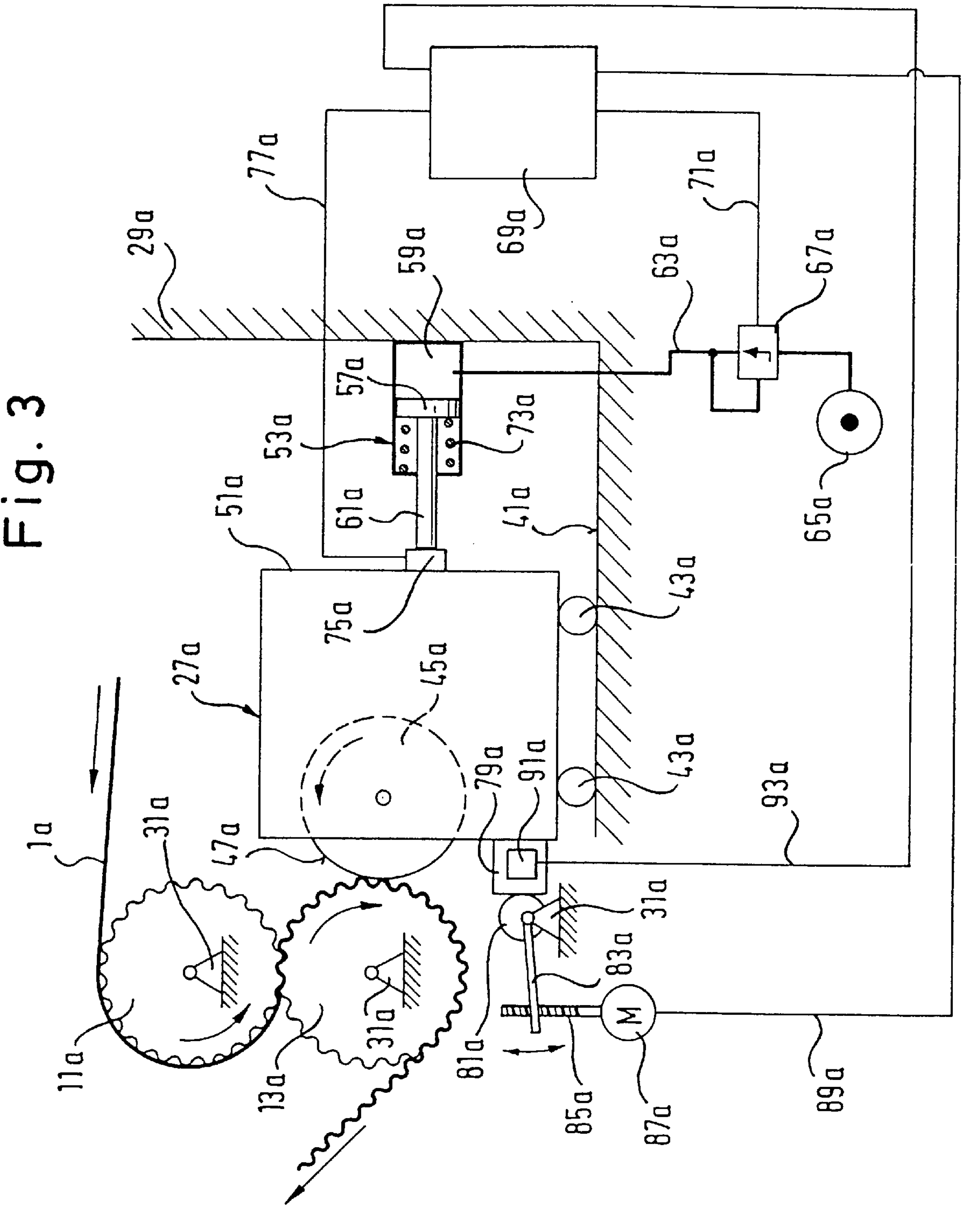
FIG. 3: A schematic diagram of a second embodiment of the device of FIG. 1.

In FIG. 3, identical or identically-acting components to those in FIGS. 1 and 2 are shown with the same reference numbers plus a small letter "a." In order to avoid repetition, the reader is referred to the description of such components in the above explanations of FIGS. 1 and 2. In the following, we will only discuss differences compared to the previous figures.

In FIG. 3, the force produced by the piston-cylinder unit 53*a* is essentially divided into two force transmission paths. A first force transmission path runs, as was the case in the embodiment of FIG. 2, via the gluing roller 45*a* to the fluted roller 13*a* and from there to the machine frame 31*a*. Along this force transmission path, a force is transmitted which corresponds to the compressive force between the gluing roller 45*a* and the fluted roller 13*a*. A second force transmission path runs from the piston-cylinder unit 53*a* via the wagon 51*a* and a stop 79*a* attached to the wagon 51*a,* to a counterstop 81*a* which is installed in a fixed position with respect to the machine frame 31*a* and interacts with the stop 79*a* of the wagon 51*a,* and from there to the machine frame 31*a*. The counterstop 81*a* is adjustable. In the embodiment of FIG. 3, it is shown as a cam which can be adjusted by means of a swiveling lever 83*a*. The swiveling lever 83*a* is in threaded engagement with an adjusting spindle 85*a,* which can be driven by an electric motor 87*a*. The electric motor 87*a,* in turn, is connected to the control unit 69*a* via an additional control line 89*a* and can be actuated by the control unit 69*a* in such a way that turning of the adjusting spindle 85*a* causes pivoting of the lever 83*a* and thus displacement of the cam 81*a*. An additional force gauge 91*a* is installed on the stop 79*a* attached to the wagon 51*a,* with said gauge measuring the force transmitted along the second force transmission path. The force measurement signal emitted by the force gauge 91*a* is sent via an additional measurement signal line 93*a* to the control unit 69*a*.

In the embodiment of FIG. 3, the effective compressive force between the gluing roller 45*a* and the fluted roller 13*a* is determined based on difference between the force measurement value provided by the force gauge 75*a,* which indicates the total force made available by the piston-cylinder unit 53*a,* and the force measurement value provided by the force gauge 91*a,* which is an indicator of the force transmitted along the second force transmission path. This difference formation is carried out by the control unit 69. The actual compressive force determined in this manner is compared with a predetermined target value of compressive force. Should the result of this comparison yield a consistent error, a control signal is issued to the electric motor 87, which causes corresponding adjustment of the cam 81 until the detected consistent error has been eliminated.

By adjustment of the cam 81*a,* in the case of the machine according to FIG. 3, the relationship between the forces transmitted on the two force transmission paths can be modified. This means that by adjusting the cam 81*a,* the effective force between the gluing roller 45*a* and the fluted roller 13*a* can be modified, with the force made available by the piston-cylinder unit 53*a* remaining constant. The force transmitted along the second force transmission path is made large compared to the effective compressive force transmitted along the first force transmission path. The wagon 51*a* is therefore pressed with a high excess force against the counterstop 81*a*. This results in coupling of the gluing unit 27*a* to the machine frame 31*a* which is characterized by a high degree of resistance to fluctuation. Fluctuations in the width of the gluing gap between the gluing roller 45*a* and the fluted roller 13*a* are thus essentially completely eliminated.

In both the FIG. 2 embodiment and the FIG. 3 embodiment, by selective coordination of the friction between the wheels 43 or 43*a* and the roller guide 41 or 41*a*, one can also exert selective influence on the damping behavior of the gluing unit 27 or 27*a* and thus reduce the tendency towards the occurrence of fluctuations in the width of the gluing gap.

In the FIGS. 2 and 3 embodiment, it is not absolutely necessary to measure the force produced by the piston-cylinder unit 53 or 53*a* by means of a force gauge 75 or 75*a*. Information on this force produced by the cylinder-piston unit 53 or 53*a* can also be obtained by dispensing with the force gauge 75 or 75*a* and instead inserting a manometer in the hydraulic line 63 or 63*a*, which measures the hydraulic pressure prevailing in the hydraulic line 63 or 63*a* and thus in the working chamber 59 or 59*a*. By means of this measured hydraulic pressure, one can directly determine the force produced by the cylinder-piston unit 53 or 53*a*. In the practical example of FIG. 2 in particular, one can thus directly determine the effective compressive force between the gluing roller 45 and the fluted roller 13 by means of the measured hydraulic pressure. It is also possible, instead of the force gauge 75 or 75*a* shown in FIGS. 2 and 3, to include a pressure measurement device measuring the pressure in the working chamber 59 or 59*a* in a control loop with the control unit 69 or 69*a* and the pressure regulation valve 67 or 67*a*.

What is claimed is:

1. Method for manufacturing a composite sheet (5) comprising at least one corrugated sheet (1) and at least one flat sheet (3), which is glued to the wave peaks of the corrugated sheet (1), said method comprising:

(a) covering a portion of the circumference of at least one fluted roller (13) with the corrugated sheet (1) during operation;

(b) applying a continuous film of a liquid glue, used to attach the corrugated sheet (1) to the flat sheet (3), to the outer surface (47) of a gluing roller (45) of a gluing unit (27), the axis of said gluing roller being essentially parallel to that of the fluted roller (13);

(c) driving said gluing roller at approximately the same peripheral speed as that of the fluted roller (13);

(d) moving said gluing roller (45) closer to the fluted roller (13), with the outer surface (47) of the gluing roller pressing against the portion of the circumference of the fluted roller (13) that is covered with the corrugated sheet (1), thus pressing the gluing roller (45) against the corrugated sheet (1) and the corrugated sheet (1) against the fluted roller (13), thus forming a gluing gap allowing the glue to be transmitted to the wave peaks of the corrugated sheet (1);

(e) setting a predetermined compressive force between the gluing roller (45) and the fluted roller (13) with a maximum line pressure of between 0.1 N/mm and 10.0 N/mm; and (f) controlling movement of the rollers closer together (53, 65, 67, 69) with a control means (67, 69) for the controlled maintenance of the predetermined compressive force between the gluing roller (45) and the fluted roller (13) during operation of the method.

2. Method of claim 1 in which the maximum line pressure is between 0.3 N/mm and 5.0 N/mm.

3. Method of claim 2 in which the maximum line pressure is between 0.5 N/mm and 3.0 N/mm.

4. Method for manufacturing a composite sheet (5) comprising at least one corrugated sheet (1) and at least one flat sheet (3), which is glued to the wave peaks of the corrugated sheet (1), said method comprising:

(a) covering a-portion of the circumference of at least one fluted roller (13) with the corrugated sheet (1) during operation;

(b) applying a continuous film of a liquid glue, used to attach the corrugated sheet (1) to the flat sheet (3), to the outer surface (47) of a glun roller (45) of a gluing unit (27), the axis of said gluing roller being essentially parallel to that of the fluted roller (13);

(c) driving said gluing roller at approximately the same peripheral speed as that of the fluted roller (13);

(d) moving said gluing roller (45) closer to the fluted roller (13), with the outer surface (47) of the gluing roller pressing against the portion of the circumference of the fluted roller (13) that is covered with the corrugated sheet (1), thus pressing the gluing roller (45) against the corrugated sheet (1) and the corrugated sheet (1) against the fluted roller (13), thus forming a gluing gap allowing the glue to be transmitted to the wave peaks of the corrugated sheet (1);

(e) setting a predetermined compressive force between the gluing roller (45) and the fluted roller (13); and (f) controlling movement of the rollers closer together (53, 65, 67, 69) with a control means (67, 69) for the controlled maintenance of the predetermined compressive force between the gluing roller (45) and the fluted roller (13) during operation of the method;

(g) adjusting at least one of:

(i) the predetermined compressive force acting in the gluing gap between the fluted roller (13) and the gluing roller (45) and (ii) a fluctuation of the width of the gluing gap between the fluted roller (13) and the gluing roller (45) by comparing the glued composite sheet with product characteristics of a pre-glued exemplary product (5) of the device, wherein at least one of a set of parameters determining the product characteristics, includes the thickness of the glue film, the viscosity of the glue, the gluing properties of the glue, the material properties of the corrugated sheet (1), and in particular, the absorption capacity of the corrugated sheet (1), the moistening conditions between the corrugated sheet (1) and the glue, and the peripheral speeds of the fluted roller (13) and the gluing roller (45).

5. Method for manufacturing a composite sheet (5) comprising at least one corrugated sheet (1) and at least one flat sheet (3), which is glued to the wave peaks of the corrugated sheet (1), said method comprising:

(a) covering a portion of the circumference of at least one fluted roller (13) with e corrugated sheet (1) during operation;

(b) applying a continuous film of a liquid glue, used to attach the corrugated sheet (1) to the flat sheet (3), to the outer surface (47) of a gluing roller (45) of a gluing unit (27), the axis of said gluing roller being essentially parallel to that of the fluted roller (13);

(c) driving said gluing Toller at approximately the same peripheral speed as that of the fluted roller (13); p1 (d) moving said gluing roller (45) closer to the fluted roller (13), with the outer surface (47) of the gluing roller pressing against the portion of the circumference of the fluted roller (13) that is covered with the corrugated sheet (1), thus pressing the gluing roller (45) against the corrugated sheet (1) and the corrugated sheet (1) against the fluted roller (13), thus forming a gluing gap allowing the glue to be transmitted to the wave peaks of the corrugated sheet (1);

(e) setting a predetermined compressive force between the gluing roller (45) and the fluted roller (13); and (f) controlling movement of the rollers closer together (53, 65, 67, 69) with a control means (67, 69) for the controlled maintenance of the predetermined compressive force between the gluing roller (45) and the fluted roller (13) during operation of the method;

(g) adjusting at least one of:

(i) the predetermined compressive force acting in the gluing gap between the fluted roller (13) and the gluing roller (45) and (ii) a fluctuation of the width of the gluing gap between the fluted roller (13) and the gluing roller (45) by comparing the glued composite sheet with product characterstics of a pre-glued exemplary product (5) of the device, in which a gluing pattern in the wave peak area of the corrugated sheet (1) serves as an assessment criterion for product characteristics, the preferred gluing pattern being a uniform series of gluing patterns in successive wave peak areas of the corrugated sheet (1).

6. Method of claim 5, including dying the wave peak areas of the corrugated sheet whereby the gluing pattern can be determined through optical observation.

7. Method for manufacturing a composite sheet (5) comprising at least one corrugated sheet (1) and at least one flat sheet (3), which is glued to the wave peaks of the corrugated sheet (1), said method comprising:

(a) covering a portion of the circumference of at least one fluted roller (13) ith the corrugated sheet (1) during operation, (b) applying a continuous film of a liquid glue, used to attach the corrugated sheet (1) to the flat sheet (3), to the outer surface (47) of a gluing roller (45) of a gluing unit (27), the axis of said gluing roller being essentially parallel to that of the fluted roller (13);

(c) driving said gluing roller at approximately the same peripheral speed as that of the fluted roller (13);

(d) moving said gluing roller (45) closer to the fluted roller (13), win the outer surface (47) of the gluing roller pressing against the portion of the circumference of the fluted roller (13) that is covered with the corrugated sheet (1), thus pressing the gluing roller (45) against the corrugated sheet (1) and the corrugated sheet (1) against the fluted roller (13), thus forming a gluing gap allowing the glue to be transmitted to the wave peaks of the corrugated sheet (1);

(e) setting a predetermined compressive force between the gluing roller (45) and the fluted roller (13); and (f) controlling movement of the rollers closer together (53, 65, 67, 69) with a control means (67, 69) for the controlled maintenance of the predetermined compressive force between the gluing roller (45) and the fluted roller (13) during operation of the method;

(g) displaceably guiding a gluing roller support (51) with respect to the fluted roller (13) by guiding means (41) and holding the gluing roller;

(h) moving the rollers closer together (53, 65, 67, 69) by means of at least one force-generating means (53) that engages with the gluing roller support (51) in order to transmit a force to the gluing roller support (51); and (i) branching the force produced by at least one force-generating means (53*a*) into a first force transmission path (53*a,* 51*a,* 45*a,* 13*a,* 31*a*) that transmits a compressive force between the gluing roller (45*a*) and the fluted roller (13*a*) and at least one additional force transmission path (53*a,* 51*a,* 79*a,* 81*a,* 31*a*).

8. Method of claim 7, comprising terminating the at least one additional force transmission path (53*a,* 51*a,* 79*a,* 81*a,* 31*a*) in a stop means (79*a,* 81*a*).

9. Method of claim 8, in which the stop means (79*a,* 81*a*) includes at least one stop (79*a*) that is arranged to move together with the gluing roller (45*a*) along the path on which it moves closer to the fluted roller (13*a*), and further includes at least one counterstop (81*a*) that is fixed with respect to the rotational axis of the fluted roller (13*a*).

10. Method of claim 7, including modifying the relationship between the forces that are transmitted via the first force transmission path (53*a,* 51*a,* 45*a,* 13*a,* 31*a*) and the at least one additional force transmission paths (53*a,* 51*a,* 79*a,* 81*a,* and 31*a*).

11. Method of claim 10, in which modifying the relationship of the forces acting along the fist and additional force transmission paths (53*a,* 51*a,* 45*a,* 13*a,* 31*a* and 53*a,* 51*a,* 79*a,* 81*a,* 31*a*) includes adjusting at least one of the following components: the stop (79*a*) and the counterstop (81*a*).

12. Method of claim 10, comprising controlling the force transmitted in the first force transmission path (53*a,* 51*a,* 45*a,* 13*a,* 31*a*) to be small relative to the force produced by the at least one force-generating means (53*a*).

13. Method of claim 7, in which the force transmitted in the first force transmission path (53*a,* 51*a,* 45*a,* 13*a,* 31*a*) is small relative to the force produced by the at least one force-generating means (53*a*).

14. Method of claim 7, including operating measurement means (75*a,* 91*a*) for determining a compressive force between the gluing roller (45*a*) and the fluted roller (13*a*).

15. Method of claim 14, comprising controlling maintenance of a predetermined value of the compressive force or a predetermined variation of the compressive force depending on the time or the path along which the gluing roller and the fluted roller are moved closer together by means of a control loop including the measuring means (75*a* 91*a*), together with the adjustment means (67*a*) and the control means (69*a*).

16. Method of claim 14, comprising measuring the force produced by the at least one force-generating means (53*a*) by means of the measuring means (75*a,* 91*a*).

17. Method of claim 7 including measuring the force transmitted along at least one additional force transmission path (53*a,* 51*a,* 79*a,* 81*a,* 31*a*) by means of the measuring means (75*a,* 91*a*).

18. Method for manufacturing a composite sheet (5) comprising at least one corrugated sheet (1) and at least one flat sheet (3), which is glued to the wave peaks of the corrugated sheet (1), said method comprising:

(a) covering a portion of the circumference of at least one fluted roller (13) with the corrugated sheet (1) during operation;

(b) applying a continuous film of a liquid glue, used to attach the corrugated sheet (1) to the flat sheet (3), to the outer surface (47) of a gluing roller (45) of a gluing unit (27), the axis of said gluing roller being essentially parallel to that of the fluted roller (13);

(c) driving said gluing roller at approximately the same peripheral speed as that of the fluted roller (13);

(d) moving said gluing roller (45) closer to the fluted roller (13), with the outer surface (47) of the gluing roller pressing against the portion of the circumference of the fluted roller (13) that is covered with the corrugated sheet (1), thus pressing the gluing roller (45) against the corrugated sheet (1) and the corrugated sheet (1) against the fluted roller (13), thus forming a gluing gap allowing the glue to be transmitted to the wave peaks of the corrugated sheet (1);

(e) setting a predetermined compressive force between the gluing roller (45) and the fluted roller (13); and (f) controlling movement of the rollers closer together (53, 65, 67, 69) with a control means (67, 69) for the controlled maintenance of the predetermined compressive force between the gluing roller (45) and the fluted roller (13) during operation of the method;

g) displaceably guiding a gluing roller support (51) with respect to the fluted roller (13) by guiding means (41) and holding the gluing roller;

(h) moving the rollers closer together (53, 65, 67, 69) by means of at least one force-generating means (53) tat engages with the gluing roller support (5 1) in order to transit a force to the gluing roller support (51);and (i) generating the force by means of a piston-cylinder unit which can be hydraulically actuated.

* * * * *